UNITED STATES PATENT OFFICE.

MARK W. MARSDEN, OF CONNELLSVILLE, ASSIGNOR TO JAMES W. CAMPBELL AND ALEXANDER MATCHETT, OF PITTSBURG, PENNSYLVANIA.

ADHESIVE PASTE.

SPECIFICATION forming part of Letters Patent No. 376,445, dated January 17, 1888.

Application filed January 20, 1887. Serial No. 224,589. (No specimens.)

*To all whom it may concern:*

Be it known that I, MARK W. MARSDEN, of Connellsville, in the county of Fayette and State of Pennsylvania, have invented a new useful Improvement in Adhesive Paste; and I do hereby declare the following to be a full, clear, and exact description thereof.

My invention relates to an improvement in adhesive flour paste. This substance is largely used in the arts for very many purposes, and is commonly made by boiling flour or starch and water until it attains the proper consistence. The disadvantage of paste prepared in this way is that it is difficult to prepare it without lumps and of a homogeneous composition, and that it is apt to spoil and to produce an unpleasant odor. This last-named feature is specially objectionable when the paste is used in houses with wall-paper. The paste cannot be made without boiling water, and its preparation involves considerable trouble and is disagreeable.

To avoid these objections and to provide an efficient flour paste prepared by chemical action is the object of my invention.

To this end my invention consists, first, in a paste compound containing flour, starch, or other farinaceous substance, with an alkali, preferably caustic soda, (NaHO,) or caustic potash, (KHO,) or some other strongly-alkaline substance. If the flour be mixed with any of these substances in the form of powder in the proper proportions they form a compound which, when mixed with water, will soon assume the consistence of a paste and will become soluble in water. The action of the alkali on the flour bursts the starch-cells and digests or dissolves it, increasing its bulk and reducing it to a paste, which may be thinned by the addition of water or thickened by the addition of more of the alkali and flour. This compound is sold as a powder to be mixed with water by the user.

The proportion of ingredients which I have found suitable for this form of paste is as follows: about eighty-four parts of flour, &c., to eight parts of pulverized caustic soda or caustic potash. If another form of alkali—such as strong soda ash—of less strength than the caustic soda or potash be used, its quantity should be increased until sufficient be had to thoroughly digest the flour; but I have found that in order to digest the flour with rapidity a strong alkali must be employed.

Substances weakly alkaline—such as bicarbonate of soda—are not strong enough to digest the flour. They must be strongly alkaline, by which I mean sufficiently strong to act on the flour and to make it pasty.

Paste compounded in this way may be used for some purposes; but it possesses an objectionable feature in that it has a strongly-alkaline reaction, and is apt to discolor paper, especially when the paper is colored or tinted, as is the case with most kinds of wall-paper and labels. To prevent this and to provide a neutral dry paste compound is the object of the second feature of my invention. It consists in a compound containing certain ingredients adapted to the neutralization of the alkaline paste prepared as above described. Thus, if oxalic acid, tartaric acid, or other acid in a solid form be added to the compound, it will, when water is mixed in with the mass, combine with the alkali to form a neutral salt. The proper amount of acid to be added to the mixture depends upon the nature and strength of the alkali and acid used, and is easily determined. The action of this compound is not altogether perfect, because the acid and alkali, being both made active at once by solution in water, will to some extent react on each other to make a salt before the flour is completely digested. A larger quantity of these substances than is chemically necessary under other conditions must therefore be employed. The oxalic acid is also disadvantageous, because it is poisonous, and the tartaric acid is somewhat expensive. While, therefore, my invention may be practiced in this way, I prefer to use as a neutralizing agent, instead of the acids, ammonium sulphate $[(NH_4)_2SO_4]$ or some other similar unstable compound, which, when exposed to the alkaline solution, will cause a double decomposition, whereby potassium sulphate or sodium sulphate, as the case may be, and ammonium hydrate are produced. I employ these ingredients in the following proportions: flour, starch, or other farinaceous substance, eighty-four parts; pulverized caustic soda or caustic potash, eight parts, (a greater quantity of alkali should be used in case some weaker alkaline substance is employed, as described above;) sulphate of ammonium, eight parts. These materials, when thoroughly mixed together, constitute the completed paste compound in its commercial form. To apply it to use, I add to it a little water. The water dissolves the alkali and the ammonium sulphate, and immediately the following reactions take place: The alkali quickly digests the flour, in a few minutes swelling it up and reducing it into a paste, which gradually grows thicker in consistence. At the same time, but much more slowly, the ammonium sulphate acts on the strong alkali, and a double decomposition takes place, which results in neutral potassium sulphate or sodium sulphate, as the case may be, and ammonium hydrate, which latter passes off slowly as a gas, thereby gradually decreasing the alkalinity of the mixture. This reaction is slow, and therefore the ammonium sulphate does not neutralize the strong alkali until after the flour has been completely digested. After the completion of this process, the paste, if not of the desired consistence, may be made more fluid or thicker by the addition of water or of the paste compound. The paste is very strong and adhesive. After it is mixed it is free from lumps, and it will remain in condition for use for several weeks without spoiling. It is not liable to fermentation and decay and is not poisonous. An especial advantage is its convenient form and the ease with which it may be mixed for use. As a powder, it may be preserved without change indefinitely if kept in a dry place, and the fact that a given quantity of the powder will make about eight times its own volume of paste makes it easy to handle commercially and to transport. It will be found to be an efficient article for wall-paper, labels, book-binding, and for shoe-makers' use, and generally for all uses to which ordinary flour paste is put. It is better than the flour paste, because of its homogeneity and greater adhesive properties.

I am aware that in English patent to Lake, No. 520 of 1879, there is described a process of making vegetable glue by opening the gluten-cells of potato starch by the action of alkalies, and then treating the product with salts alone or with salts and acids; but no salts have been employed which unite with the alkali to form a neutral compound in the manner in which the ammonium sulphate of my compound acts.

I therefore claim as my invention—

1. The hereinbefore-described method of making paste, which consists in treating a farinaceous substance with a strong alkali, whereby said substance is digested, and neutralizing said alkali with an ammonium salt, substantially as and for the purposes described.

2. A dry paste compound consisting of a mixture of flour, starch, or other farinaceous substance and a strongly-alkaline dry substance—such, for example, as caustic soda—whereby the flour, &c., is digested, substantially as and for the purposes described.

3. A dry paste compound consisting of a mixture of flour, starch, or other farinaceous substance, an alkali, and a dry substance which, when in solution, has an affinity for the alkali and is of a property to neutralize it, substantially as and for the purposes described.

4. A dry paste compound consisting of a mixture of flour, starch, or other farinaceous substance, an alkali, and ammonium sulphate, substantially as and for the purposes described.

In testimony whereof I have hereunto set my hand this 18th day of January, A. D. 1887.

MARK W. MARSDEN.

Witnesses:
W. B. CORWIN,
THOMAS W. BAKEWELL.